March 20, 1945.  W. R. COYNE  2,371,676
DRILL GRINDING DEVICE
Filed Feb. 5, 1943  2 Sheets-Sheet 1
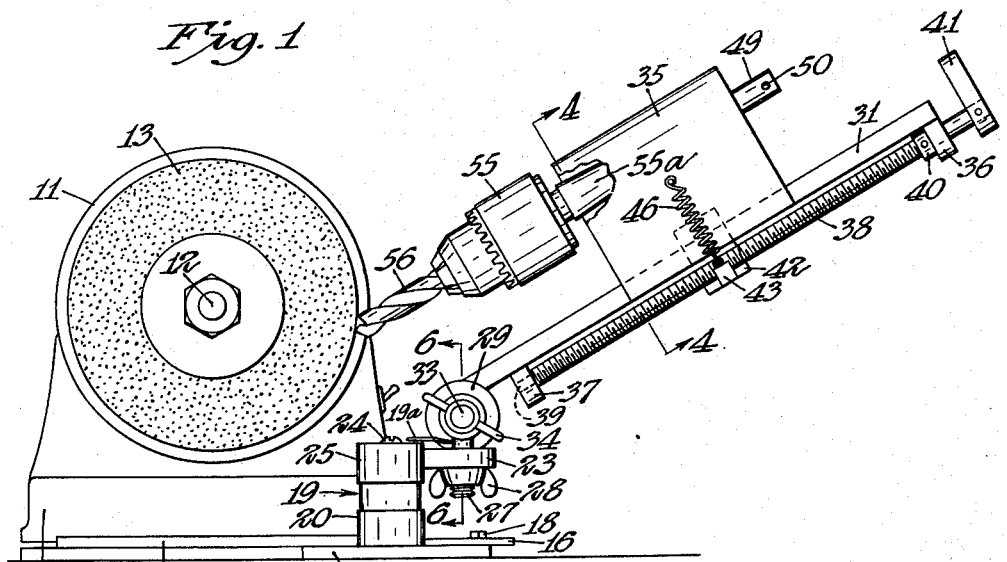
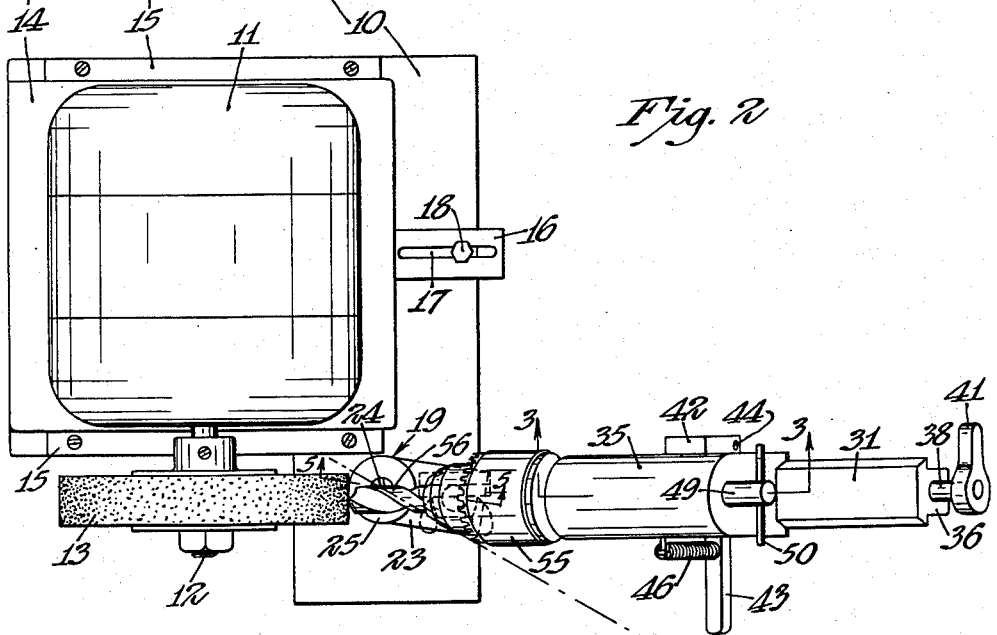
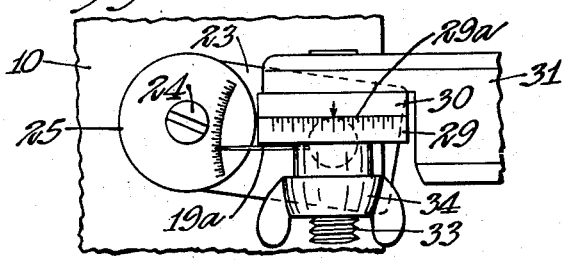
Inventor
William R. Coyne
By Williamson & Williamson
Attorneys March 20, 1945. W. R. COYNE 2,371,676
DRILL GRINDING DEVICE
Filed Feb. 5, 1943 2 Sheets-Sheet 2
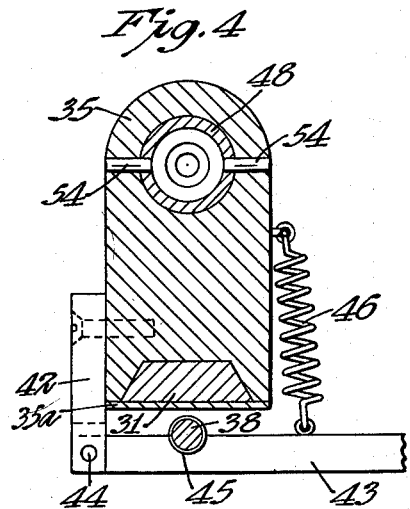
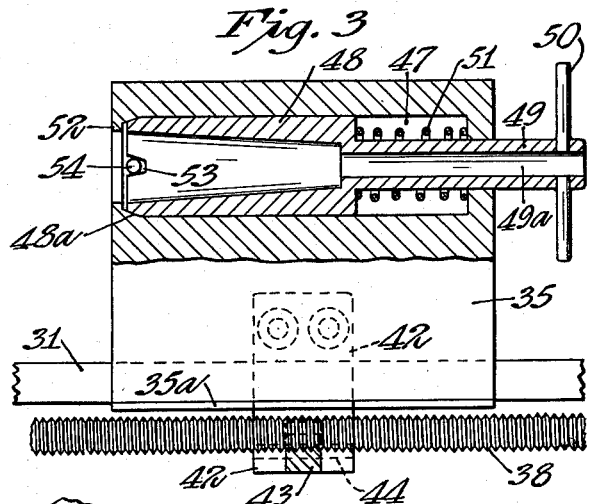
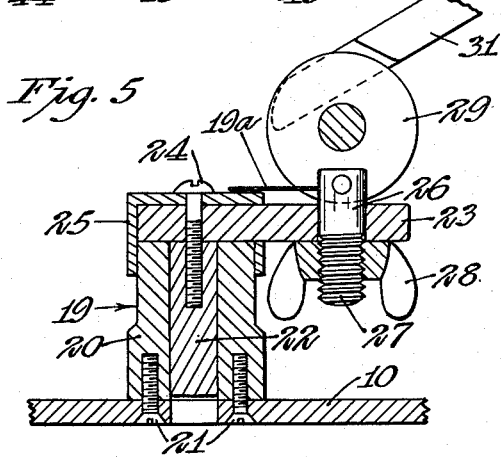
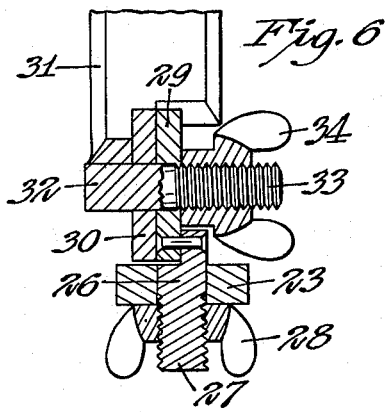
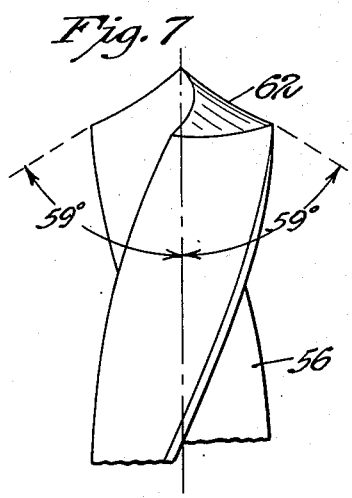
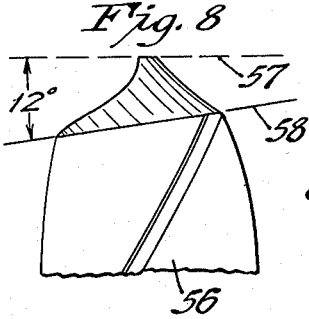
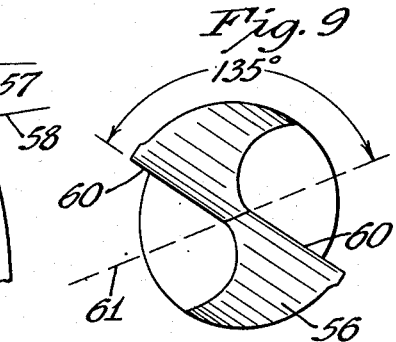
Inventor
William R. Coyne
By Williamson & Williamson
Attorneys Patented Mar. 20, 1945

2,371,676

UNITED STATES PATENT OFFICE 2,371,676

DRILL GRINDING DEVICE

William R. Coyne, Minneapolis, Minn., assignor to Pillsbury Flour Mills Company, Minneapolis, Minn., a corporation of Delaware Application February 5, 1943, Serial No. 474,788

1 Claim. (Cl. 51—219)

This invention relates to drill grinding apparatus and more particularly to drill grinders which are capable of highly efficient and extremely precise operation and adjustability.

An object of the invention is to provide a drill grinder which is easily and accurately adjustable so that it is capable of grinding much smaller drills than conventional drill grinders previously in use.

Another object of my invention is to provide a drill grinder for use with a rotary grinding wheel wherein the lips of the drill are provided with concave shapes from the point of the drill to its circumference.

A further object of the invention is to provide easily adjustable, simple and efficient means for obtaining different angles of lip clearance and for accurately duplicating the lip cut at both sides of the drill as well as to properly form the center end portion of the drill.

These and other objects and advantages of the invention will more fully appear from the following description made in connection with the accompanying drawings, wherein like reference characters refer to the same parts throughout the views, and, in which:

Fig. 1 is an end elevation of the grinding unit;

Fig. 2 is a plan view of the device;

Fig. 3 is a fragmentary side view of the drill holding bracket and drill holder per se with portions of the drill holder in section, approximately on the line 3—3 of Fig. 2;

Fig. 4 is an enlarged section taken approximately on the line 4—4 of Fig. 1;

Fig. 5 is an enlarged section taken approximately on the line 5—5 of Fig. 2;

Fig. 6 is an enlarged section taken approximately on the line 6—6 of Fig. 1;

Fig. 7 is an illustration of the lip angle of a drill;

Fig. 8 is an illustration of the angle of lip clearance of a drill;

Fig. 9 is an illustration of the angle between a line through the point of a drill and the cutting edge thereof, and Fig. 10 is an enlarged fragmentary view of the adjustable pivots.

In Figs. 1 and 2 there is shown a base plate 10 which supports a motor 11 having a shaft 12 upon which is mounted a rotary grinding wheel 13. The motor base 14 rests between a pair of guides 15 so that the motor will slide backwardly and forwardly or left and right as viewed in Fig. 2. Connected to the motor base 14 is a tongue 16 having a slot 17 through which extends a bolt 18 which is screwed into the base 10. When the bolt 18 is loosened the motor can be shifted back and forth a distance limited by the slot 17. Extending upwardly from the base 10 is a vertical pivot unit 19 which is shown in detail in Fig. 5. This unit 19 includes a sleeve 20 secured to the base by countersunk screws 21. Closely fitting in the sleeve 20 is a pivot pin 22 which has an offset arm 23 secured to its upper end by a bolt 24. A cap 25 lies over the sleeve 20, the inner end of the arm 23 and beneath the head of the bolt 24.

On the outer or free end of the pivot arm 23 is a vertical pivot pin 26 having a lower threaded portion 27 upon which is mounted a thumb nut 28. The upper end of the vertical pivot pin 26 has a circular apertured bearing member 29 formed thereon and said bearing member 29 abuts a similarly shaped bearing member 30 forming the inner or lower portion of a bracket 31. A horizontal pivot pin 32 is secured to and extends from the pivot bearing member 30, through the bearing member 29 and extends outwardly therefrom in the form of a threaded portion 33. A thumb nut 34 is carried on the threaded portion 33.

As shown in Figs. 2, 4 and 6 the sides of the bracket 31 are slanted outwardly and downwardly, and slidably mounted upon said bracket is a drill holding block or body 35. The block or body 35 is provided with a base plate 35a which is suitably secured to the bottom of said block and which extends beneath the bracket 31 to prevent upward displacement of said block 35. Adjacent opposite ends of the bracket 31, as shown in Fig. 1, are downwardly extending lugs 36 and 37, and a threaded rod 38 passes through the lug 36, and the lower end of said rod 38 is journalled in the lug 37 as shown at 39. A collar 40 prevents movement of the threaded rod 38 longitudinally of said rod in a direction away from the reduced journal end 39 on the rod. Said rod 38 has an operating handle 41 to assist in rotating the same.

As best shown in Fig. 4 the drill holder block or body 35 has an arm 42 extending downwardly from one side thereof which has pivotally connected thereto a lever 43, the pivot point being at 44. The lever 43 has a half round threaded portion 45 formed therein as illustrated in Fig. 5, and said lever 43 is adapted to swing up against the threaded rod 38 so that the threaded half round cut-out 45 in the lever 43 will engage the threads on said rod 38. A tension spring 46 normally holds the lever 43 in engagement with the threaded rod 38, and said lever extends outwardly, as shown in Figs. 2 and 4, so that it may be conveniently pressed by the operator to disengage the lever from the threaded rod 38. When the lever 43 and rod 38 are in engagement, as shown in Fig. 4, the handle 41 on rod 38 can be turned, and by reason of the engagement between rod 38 and lever 43 the drill holding block 35 will be moved up or down the bracket 31. However, for quicker manipulation or movement of the drill holding block or body 35 on the bracket 31 the lever 43 can be depressed to disengage it from the rod 38 and the block 35 can be quickly slid a considerable distance on the bracket 31.

In the upper portion of the drill holding block or body 35 is a cylindrical chamber 47 adapted to receive a hollow tapered socket 48. This is best shown in Fig. 3. The chamber 47 is shown to be considerably longer than the socket 48, and said socket is adapted to reciprocate in the chamber 47 and also to rotate therein. The right-hand end of the socket 48 is provided with a reduced extension 49 which extends through the upper end of said block or body 35 and is provided with a cross pin 50. A compression spring 51 is interposed between the right-hand end of the chamber 47 and the right-hand end of the socket 48 to normally urge said socket toward the left-hand end of the chamber 47. Chamber 47 at its left-hand end is defined by a shoulder 52 which limits movement of the socket 48 to the left. The left-hand end of the socket 48 is bevelled as at 48a and adapted to seat in a similarly bevelled portion of the left-hand end of the chamber 47 so that the socket 48 will firmly seat itself and eliminate any lost motion or play transversely of the axis of said socket 48.

The left-hand end of the socket 48 is open and at opposite portions of said left-hand end the socket 48 is provided with a pair of notches 53 which are shown to be wider at their open ends than they are at the bottoms of said notches. The notches 53 are adapted to receive each of a pair of pins 54 which are mounted in the block 35 adjacent the left-hand end of the chamber 47. Referring to Fig. 3 the handle 50 can be pulled to the right against the compression of the spring 51 to free the socket 48 from the pins 54 whereupon the handle 50 and socket 48 can be turned 180 degrees whereupon the pins 54 can be seated in the opposite notches 53 from those in which they were originally seated.

Referring to Figs. 1 and 2 there is shown a conventional chuck 55 having an arbor 55a which is shown seated in the socket 48, said chuck being adapted to removably receive a drill 56.

As indicated in Fig. 3 the reduced extension 49 on the socket 48 is provided with an axial bore 49a to permit the insertion of a tool for the purpose of driving the arbor 55a out of the socket 48 so that the chuck 55 can be removed from the block or body 35.

When a drill is to be sharpened the block or body 35 is backed away from the grinding wheel 13 by releasing the lever 43 from the threaded rod 38 and sliding the block toward the outer end of the bracket 31. A drill can then be inserted in the chuck 55 whereupon the block 35 can then be moved down the bracket 31 to a point adjacent the grinding wheel 13. The bracket 31 is adjustable on its horizontal pivot 33 to secure the desired angle of lip at the end of the drill relative to the axis of the drill. An average lip angle is illustrated in Fig. 7, that angle being 59 degrees from the axis of the drill as illustrated in that figure. Suitable graduations 29a on the pivot member 30 are provided to indicate the angle of the bracket 31. When the angle has been arrived at the thumb nut 34 is tightened to retain the thumb nut 34 and assist angulation of the axis of the drill relative to a tangent of the grinding wheel 13 and the point of contact at the end of the drill.

Another setting to be made is that of the offset arm 23 on the vertical pivot unit 19 to produce the desired angle of lip clearance which is illustrated in Fig. 8. This angle of lip clearance is the angle between a transverse line 57 across the point of the drill and the line 58 at the edge of the lip, and for most purposes a lip clearance angle of 12 degrees is preferred. However, this angle should be increased gradually as the drill is worn down and the cutting edge approaches the longitudinal center of the drill with repeated grinding. This is due to the fact that the web of the drill is heavier as the longitudinal center is approached and the failure to give sufficient angle of lip clearance as the center of the drill is approached is a frequent cause of splitting drills longitudinally up the web. Due to the offset of the arm 23 which is best shown in Fig. 2 when the drill 56 is swung from a position approximately that shown in Fig. 2 to a position indicated by the dotted line 59 in the same figure there will be an increasingly heavier grind as the drill is swung toward the dotted line 59 thus increasing the lip clearance as the grind proceeds from the cutting edge 60 shown in Fig. 9 around and away from said cutting edge. As the offset position of the arm 23 is increased the amount of lip clearance on the drill will also be increased and as the offset 23 is more closely lined up with the bracket 31 and pivot unit 19 the degree of lip clearance will be reduced. The degree of offset of the arm 23 is conveniently indicated by a pointer 19a which is mounted on the pivot pin 26.

When a drill has been correctly ground on both sides of the lip and the point is correctly ground the line 61 shown in Fig. 9 and extending across the center of the web at the point should be approximately 135 degrees from each of the cutting edges 60.

The above described apparatus has been seen to hold the drill initially in the same approximate plane as that of the grinding wheel 13, and the cutting of the drill point and lip is accomplished by swinging the drill while in contact with the grinding wheel about the pivot unit 19 whose axis is perpendicular to the rotational axis of the grinding wheel while maintaining the lip clearance portion of the drill in such a position that the lip and lip clearance portions are slightly concave as indicated at 62 in Fig. 7. Ordinarily the line indicated at 62 is straight in a conventional drill but with my apparatus I can produce such a concavity and it has been found in actual practice that this concave shaping of the end of the drill considerably lengthens its cutting life before resharpening is required.

My apparatus is extremely simple in structure as compared with other types of drill grinders, and it embodies several important features. One of these features is the adjustable offset arm 23 which is used to increase or decrease the angle of lip clearance and the extreme accuracy in grinding of the two end faces of the drill. When one side has been ground to the desired degree it is necessary only to rotate the socket 48 and chuck 55 180 degrees by pulling the socket outwardly or to the right against the compression of the spring 51 and turning said socket until the relative positions of the pins 54 in the notches 53 have been reversed. Then the opposite sides of the drill can be cut to exactly the same degree as the first face. It has been found that because of the simplicity of structure and lack of play or resistance throughout the several parts it is possible to grind much smaller drills and with more accuracy than has heretofore proven feasible with drill grinding apparatus. The grinding of small drills such as No. 60 drills of .040 inch in diameter has been found to be extremely successful with the apparatus.

It will, of course, be understood that various changes may be made in the form, details, arrangement and proportions of the various parts without departing from the scope of my invention.

What is claimed is:

In a drill grinder, a drill holder mounted for longitudinal axial movement, said holder including a body, a socket member longitudinally movable in said body and adapted to support a drill therein, means for normally urging said socket toward one end of said drill holder body, a lug in said body toward which said socket is normally urged, a notch in said socket adapted to receive said lug, said notch having tapered sides, the mouth of said notch being larger than said lug and the bottom of said notch being smaller than said lug, whereby said lug is positively centered in said notch at all times.

WILLIAM R. COYNE.